（12）United States Patent
Ploch et al.

(10) Patent No.: US 10,511,563 B2
(45) Date of Patent: Dec. 17, 2019

(54) HASHES OF EMAIL TEXT

(71) Applicant: Hewlett Packard Enterprise Development LP, Houston, TX (US)

(72) Inventors: Krzysztof Ploch, Belfast (GB); Andrew Robert Reid, Belfast (GB); Dermot Hardy, Belfast (GB)

(73) Assignee: MICRO FOCUS LLC, Santa Clara, CA (US)

( * ) Notice: Subject to any disclaimer, the term of this patent is extended or adjusted under 35 U.S.C. 154(b) by 54 days.

(21) Appl. No.: 15/337,244

(22) Filed: Oct. 28, 2016

(65) Prior Publication Data

US 2018/0124007 A1 May 3, 2018

(51) Int. Cl.
  *H04L 12/58* (2006.01)
  *H04L 29/08* (2006.01)
  *G06Q 10/10* (2012.01)

(52) U.S. Cl.
  CPC .......... *H04L 51/34* (2013.01); *G06Q 10/107* (2013.01); *H04L 51/22* (2013.01); *H04L 67/02* (2013.01)

(58) Field of Classification Search
  CPC ......... H04L 51/22; H04L 51/34; H04L 67/02; G06F 21/562; G06Q 10/107
  USPC ................................. 709/206, 224
  See application file for complete search history.

(56) References Cited

U.S. PATENT DOCUMENTS

| 7,639,818 | B2 * | 12/2009 | Fujimoto | G06F 21/64 380/277 |
| 7,672,436 | B1 * | 3/2010 | Thenthiruperai | H04M 1/72552 379/88.04 |
| 7,870,210 | B2 | 1/2011 | Bhogal et al. | |
| 9,092,434 | B2 | 7/2015 | Kumar et al. | |
| 9,426,111 | B1 | 8/2016 | Ross | |
| 2002/0078158 | A1 * | 6/2002 | Brown | H04L 29/06027 709/206 |
| 2004/0073617 | A1 * | 4/2004 | Milliken | G06F 21/562 709/206 |
| 2006/0190830 | A1 | 8/2006 | Gerstl et al. | |
| 2009/0157820 | A1 * | 6/2009 | Sampang | G06F 17/2211 709/206 |
| 2010/0260187 | A1 * | 10/2010 | Ongole | H04L 12/4641 370/395.53 |
| 2015/0032829 | A1 | 1/2015 | Barshow et al. | |

FOREIGN PATENT DOCUMENTS

WO    WO-2008052239 A1 *  5/2008   ......... G06F 17/2229

OTHER PUBLICATIONS

Benno Stein, Applying Hash-based Indexing in Text-based Information Retrieval, Mar. 28, 2007, https://pdfs.semanticscholar.org/0bf5/1ce34e2bac1b8d5dbced4f4e88204a4c2569.pdf.*

(Continued)

*Primary Examiner* — Zi Ye

(57) ABSTRACT

Examples described herein include receiving text of an email, determining a header of an email message in the email, and determining a body of the email message. Examples also include modifying the text of the email to indicate a beginning boundary and an ending boundary of the header, modifying the text of the email to indicate a beginning boundary and an ending boundary of the body, generating a hash of the header, generating a hash of the body, and tracing the email based on the hash of the header.

16 Claims, 7 Drawing Sheets

(56) References Cited

OTHER PUBLICATIONS

Aumayr, E. et al., "Reconstruction of Threaded Conversations in Online Discussion Forums", Proceedings of the Fifth International AAAI Conference on Weblogs and Social Media, Digital Enterprise Research Institute, Ireland, Apr. 12, 2011, 8 pages.
Extended European Search Report for application No. 17196116.2-1958; dated Feb. 1, 2018, 7 pages.

* cited by examiner

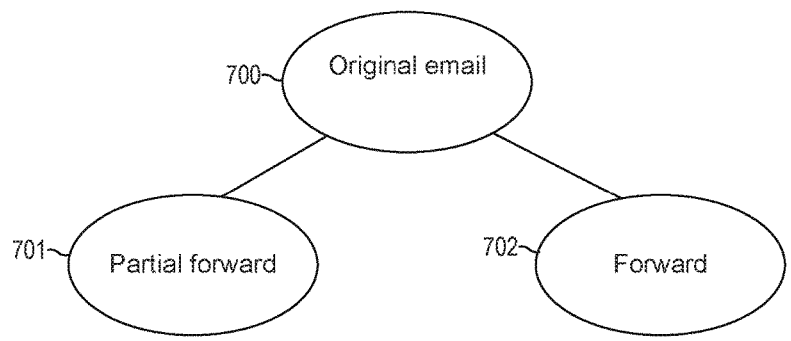

*FIG. 7A*

| Email | Email Message | Subject | Hash Value | From | Hash Value | Paragraph | Content | Hash Value |
|---|---|---|---|---|---|---|---|---|
| 700 | | | | | | | | |
| | 1 | Tomorrow | X ~703 | A | Y ~704 | 1 | Hi All- Excited about tomorrow? | W ~705 |
| | | | | | | 2 | Please meet at my cube at 1:00pm. | Z ~706 |
| 701 | | | | | | | | |
| | 1 | Tomorrow | X ~703 | A | Y ~704 | 1 | Details as follows for tomorrow's event: | U |
| | | | | | | 2 | Please meet at my cube at 1:00pm. | Z ~706 |
| 702 | | | | | | | | |
| | 1 | FW: Tomorrow | W | C | | 1 | Check out A's message below | V |
| | 2 | Tomorrow | X ~703 | A | Y ~704 | 1 | Hi All- Excited about tomorrow? | W ~705 |
| | | | | | | 2 | Please meet at my cube at 1:00pm. | Z ~706 |

*FIG. 7B*

HASHES OF EMAIL TEXT

BACKGROUND

Many environments are becoming increasingly reliant on communication via electronic messaging, such as email. For example, many organizations have transitioned to offices where information is communicated almost exclusively using electronic messaging. Due to the increased reliance on electronic message, an organization may keep archives of its electronic messages in case the organization needs to access the information in the future.

BRIEF DESCRIPTION OF THE DRAWINGS

The following detailed description references the drawings, wherein:

FIG. 7A is a diagram of traced email relationships, according to some examples.

FIG. 7B is a diagram of hash values of the traced emails of FIG. 7A.

DETAILED DESCRIPTION

Figure 1:
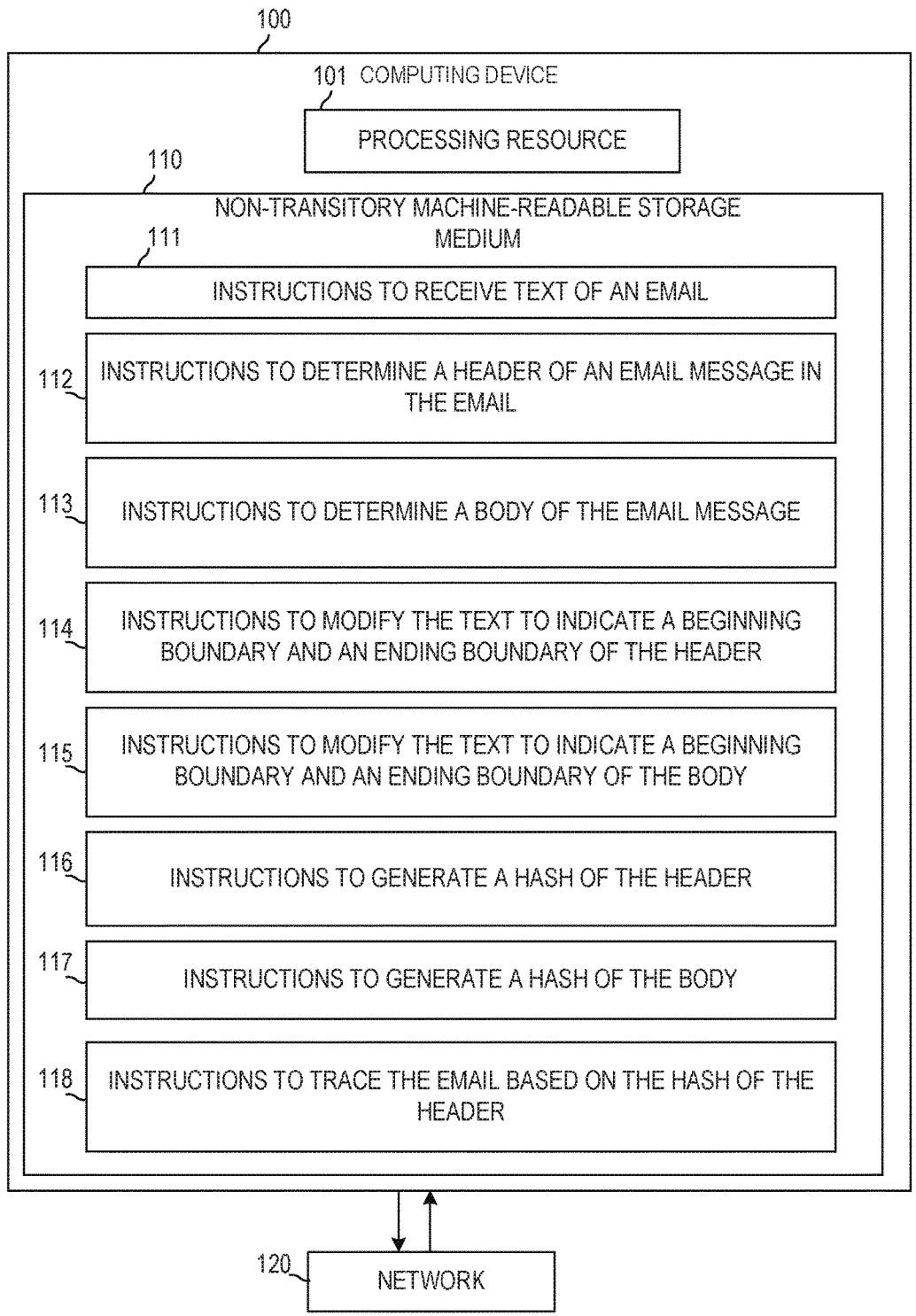
FIG. 1 is a block diagram of a computing device to trace an email, according to some examples.

Due to the structure and nature of emails, an email may be related to many other emails. For example, an email that is a current "reply all" to an original email message may include the original email message, the current "reply all" email message, and any other "reply all" email messages before the current "reply all" email message. Thus, the current "reply all" email would be related to the original email along with all the other "reply all" emails. An email may also be related to other emails even though the email is not a reply or a forward of the other emails. For example, a user may copy content from an email and send the copied content in another email. Thus, the new email may contain content from an old email but may not include the entire old email.

In some situations, it may be useful to identify emails that are related to each other. It may also be useful to quickly identify emails that are relevant or related to a specific topic. For example, during electronic discovery (e-discovery), it may useful to be able to quickly label an entire group of emails as being relevant to the litigation subject rather than have to look and evaluate each email individually.

In some situations, text searches and server-assigned metadata may be used to relate emails together. However, while a small volume of emails may be quickly searchable via text searches, larger volumes may take a significantly longer time. Additionally, the metadata assigned to the emails is often times server-specific. Thus, the server-specific metadata is not translatable across emails originating from multiple servers. Additionally, the metadata is not able to capture the emails in which content from another email is copied, but the other email itself is not forwarded or replied to.

Examples disclosed herein address these technical challenges by providing a way to trace and group emails based on the context, and specifically, the text, of emails. The text of an email may be processed and boundaries within the email may be determined. Such boundaries may include the email's header, signature, a generic portion (e.g. legal disclaimer, etc.), and the body of the email. In some examples, the body of the email may be further broken down into individual paragraphs. Hashes of each boundary may be generated. The hashes associated with the email may then be used to trace the email by comparing the hashes associated with the email to hashes associated with other emails. Accordingly, examples disclosed herein rely on the content of the email, and specifically portions of the content at a time, to trace the email. This results in content-specific grouping of the emails and more accurate grouping of emails. In this manner, examples disclosed herein may determine if an email includes content that traceable to another email, even though the email is not a forward or a reply of the other email. Examples disclosed herein are also not dependent on server-specific data to relate and trace emails.

In some examples, a computing device is provided with a non-transitory machine-readable storage medium. The non-transitory machine-readable storage medium comprises instructions executable by a processing resource to receive text of an email, determine a header of an email message in the email, determine a body of the email message, modify the text to indicate a beginning boundary and an ending boundary of the header, modify the text to indicate a beginning boundary and an ending boundary of the body, generate a hash of the header, generate a hash of the body, and trace the email based on the hash of the header.

In some examples, a computing device is provided, including a message engine, a content engine, and a hash engine. The message engine is to receive text of an email. In some examples, the email comprises an email message. The message engine is also to determine a beginning and an end of the email message and to mark the email message with a first extensible markup language element. The content engine is to determine a beginning an and an end of a header of the email message, determine a beginning and an end of a body of the email message, mark the header with a second extensible markup language element, and mark the body with a third extensible markup language element. The hash engine is to generate a hash value representing the header, and to modify the text of the email to include the hash value.

In some examples, a method is provided including, receiving text of a first email, determining a first email message in the first email, and marking the text of the first email with a first extensible markup language element to indicate the first email message. The method also includes determining a body of the first email message, marking the text of the first email with a second extensible markup element to indicate the body of the first email message, determining a first paragraph of the body, marking the text of the first email with a third extensible markup language element to indicate the first paragraph of the body, and generating a hash representing the first paragraph of the body.

Referring now to the figures, FIG. 1 is a block diagram of a computing device 100 to trace an email. As used herein, a "computing device" may be a server, computer networking device, chip set, desktop computer, workstation, or any other processing device or equipment. In some examples, computing device 100 may be a workstation.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, 114, 115, 116, 117, 118, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a nonvolatile memory where a copy of software or other data is stored.

In the example of FIG. 1, instructions 111, 112, 113, 114, 115, 116, 117, and 118 are stored (e.g., encoded) on storage medium 110 and are executable by processing resource 101 to implement functionalities described herein in relation to FIG. 1. In some examples, storage medium 110 may include additional instructions, like, for example, the instructions to implement some of the functionalities described in relation to computing device 400 of FIG. 4. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. Processing resource 101 can, for example, include single or multiple cores on a chip, multiple cores across multiple chips, multiple cores across multiple devices, or suitable combinations thereof. Processing resource 101 can be functional to fetch, decode, and execute instructions 111, 112, 113, 114, 115, 116, 117, and 118 as described herein.

In some examples, and as shown in FIG. 1, computing device 100 is communicatively coupled to network 120. In some examples, network 120 may be a wireless network, a wired network, or a combination thereof that includes other computing devices. In some examples, network 120 may be an individual network or a collection of many such individual networks interconnected with each other and functioning as a single large network (e.g., the Internet or an intranet). In some examples, network 120 may be implemented as a local area network (LAN), wide area network (WAN), etc. Thus, computing device 100 may receive and send information to and from network 120.

Instructions 111 may be executable by processing resource 101 such that computing device 100 receives text of an email. As understood here, one "email" may include at least one email message. An "email message" may be an original email message, a reply email message, a reply all email message, a bcc email message, a cc email message, or a forwarded email message, etc. to the original email message. An email may capture a variety and a number of email messages. For example, an email may include the original email message and no other email messages. In this example, a writer has created a new email message and sent the email message to a recipient. As another example, an email may include the original email message and one reply email message. In this example, a recipient of the original email message may write a response to the sender of the original email message. The outgoing email to the sender of the original email may include the original email message, as well as the new reply email message. As yet another example, an email may include the original email message, two reply email messages, and a forwarded email message.

In some examples, the email may be from a computing device (e.g., an email repository server) in network 120. In some examples, the email is sent over network 120 in a structure composed of binary data that represents the text in the email. The binary data is then processed, and the email text is extracted from the binary data. In some examples, instructions 111 receives the email text and not the binary data. Thus, in these examples, the binary data is pre-processed and instructions 111 receives the extracted email text. Accordingly, in some examples, "email text" includes human language characters (i.e. email as seen by a human user that that sent or received the email or human written language), and not characters used by computers to represent the human written language. The binary data may also include metadata from the computing device (e.g., email repository server) from which the email originated from. Thus, in some examples, instructions 111 may also receive the extracted metadata along with the email text. In other examples, instructions 111 may also include instructions to receive the binary data and process the binary data to extract the email text (and metadata, if available).

As discussed above, an email received by instructions 111 may include at least one email message. In some examples, an email message may include a header and a body. Instructions 112 may be executable by processing resource 101 such that computing device 100 determines a header of an email message in the email. As used herein, "determines" or "determining" a portion (e.g., a header, a body, etc.) of an email message includes identifying text that belongs to that specific portion, including determining a beginning of that portion and determining an ending of that portion. In some examples, instructions 112 may determine a header of an email message by parsing through the email text received by instructions 111. As used herein, a "header" of an email message may include text in the email that describes where the email is from (the "from" address or sender), where the email is sent to (the "to" address(es) or recipient(s)), any carbon copy address(es) or recipient(s) ("cc"), any blind carbon copy address(es) or recipient(s) ("bcc"), a date of the email ("date") and/or subject of the email message ("subject"). In some examples, instructions 112 may be executable by processing resource 101 such that computing device 100 determines each and all of these components separately, or some of these components separately. For example, the "to" component and the "from" component may each be determined separately from each other, even though they are both considered to be "a header" of the email. A header may be expected to have a certain format. In some examples, instructions 112 may determine a header of an email message via parsing the text to identify areas having the format (e.g., with Java parsing).

Instructions 113 may be executable by processing resource 101 such that computing device 100 determines a body of the same email message in which the header is determined by instructions 112. In some examples, a body of an email message includes email message-specific content that is written by a user that expounds on the information already in a header or adds additional information than what is in a header. Another way to characterize a body of an email message is the portion of the email message that contains the substance or primary "meat" of the email message. Instructions 113 may determine a body of an email message by a process of elimination. For example, instructions 113 may determine that whatever text is remaining in the email message that is not determined to be a header by instructions 112 is the body of the email message.

In some examples, an email message may include a header, a body, and other portions, such as a signature of the email message, and a generic portion. As used herein, a generic portion of the email message may include text of an email message that is inserted into the email message by a computing device (e.g. an email server) and is not inserted into email by the writer of the email message. Some non-limiting examples of a generic portion of an email message includes disclaimers (such as legal disclaimers), text added by a computing device such as an email server, and other types of boilerplate texts. As used herein, a signature of an email message includes a portion of the email text that is a distinctive way the sender of the email message has decided to identify himself or herself. In some examples, a signature may include the sender's name, position, and/or contact information.

In some examples where the email message includes a header, a body, and/or other portions, instructions 113 may determine that the text that is the body is whatever text that is not determined to be a header of the email message. Thus, in these examples, the other portions, such as a signature and a generic portion, may be determined to be part of the body of the email message.

However, in other examples where the email message includes a header, a body, and other portions, non-transitory machine-readable storage medium 110 may include instructions to determine a signature of the email message and instructions to determine a generic portion of the email message. Instructions to determine a signature of the email message may determine a signature by processing the email text received by instructions 111. In some examples, regular expression text processing may be used to determine a signature. A signature of an email message may have specific patterns, such as the appearance of a telephone number regularly before or after a mailing address or an email address, etc. Regular expression processing may process the email text to identify portions of the email text that match the pattern. In some examples, instructions to determine a signature may use machine learning. With machine learning, patterns may be identified and expressed in algorithms based on sample signatures. The algorithms are then used to identify the signature in emails. Depending on accuracy, the algorithms may be modified by the computing device 100 until a specific level of accuracy is achieved. In some examples, the accuracy of the identified signatures may be improved by an input provided by an administrator of computing device 100. Additionally, the specific level of accuracy may also be determined by an input provided by an administrator of computing device 100. In some examples, instructions to determine a signature of the email message may use regular expression processing and machine learning. In some examples, instructions to determine a signature may include open-source solutions, such as Mailgun Talon, etc.

Instructions to determine a generic portion may determine a generic portion by processing the email text received by instructions 111. In some examples, a generic portion may be determined via regular expression processing. In some examples, the regular expression processing used may be targeted towards a generic portion that is specific to certain type of industry. For example, in the legal industry, legal disclaimers may be prevalent and inserted into email messages. In these examples, the regular expression processing may use patterns that are typically seen in legal disclaimers.

Thus, in examples where non-transitory machine-readable storage medium 110 includes instructions to determine a signature of the email message and instructions to determine a generic portion of the email messages, a body of an email message does not include a header, a signature, and a generic portion of the email message. In other words, in these examples, instructions 113 may determine that the text remaining after the determination of a header, a signature, and a generic portion is the body of the email message. Thus, a header is separated from the body, a signature is separated from the body, and a generic portion is separated from the body. These examples may lead to an increased accuracy in the tracing of emails as compared to examples where a signature and/or a generic portion is not separated from a body of the email message.

In some examples, a body of an email message may include at least one paragraph, including one paragraph, two paragraphs, three paragraphs, etc. Thus, in some examples, instructions 113 may also include instructions to determine at least one paragraph in the body of the email message, including all or some of the paragraphs in the body of the email message. For example, in an email message with a body having two paragraphs, instructions 113 may determine all of the two paragraphs, including determining where one paragraph starts, one paragraph ends, the other paragraph starts, and the other paragraph ends. As another example, in an email message with a body having three paragraphs, instructions to determine at least one paragraph may determine all of the three paragraphs or instructions to determine at least one paragraph may determine one of the three paragraphs, or two of the three paragraphs.

One paragraph that is determined may be characterized as a "first" paragraph, another paragraph that is determined may be characterized as a "second" paragraph. The usage of "first" and "second" may not or may correlate to the order in which the paragraphs actually appear in the body of the email message. For example, a "first" paragraph that is determined may be the second (or later) paragraph in the email message body. Instructions 113 may determine the paragraphs in the email message by processing the email text that is indicated as being part of the body using java text processing.

Instructions 114 may be executable by processing resource 101 such that computing device 100 modifies the email text (received by instructions 111) to indicate a beginning boundary and an ending boundary of the header that is determined by instructions 112. In some examples, this modification marks the text of the email message with a tag to indicate where the header that is determined is located. In some examples, the email text in the header is put inside Extensible Markup Language (XML) elements. An XML element may include an opening tag and a closing tag. The opening tag may be placed before the text of the header (the beginning boundary of the header) and the closing tag may be placed after the text of the header (the ending boundary of the header). In some examples, an opening tag may be <header>, <to>, <from>, <subject>, <bcc>, <cc>, <date> etc. In some examples, a closing tag may be </header>, </to>, </from>, </subject>, </bcc>, </cc>, </date>, etc. As discussed above, a header many include several components. Accordingly, when more than one header is determined, each header will have its own element. For example, if a "to" and "from" is determined, the "to" header will have tags of <to> and </to> and the "from" header will have tags of <from> and </from>. While many element tagging elements are described herein using XML elements tagging, other forms of tagging or marking the email text may be used by instructions 114, instructions 115, and other instructions described herein that discuss marking the email text.

Instructions 115 may be executable by processing resource 101 such that computing device 100 modifies the email text (received by instructions 111) to indicate a beginning boundary and an ending boundary of the body that is determined by instructions 113. In some examples, this modification marks the text of the email message with a tag to indicate where the body that is determined is located. In some examples, the email text with the body is put inside Extensible Markup Language (XML) elements. The opening tag may be placed before the text of the body (the beginning boundary of the body) and the closing tag may be placed after the text of the body (the ending boundary of the body). In some examples, an opening tag may be <body>. In some examples, a closing tag may be </body>.

As discussed above, in some examples, non-transitory machine-readable storage medium 110 may include instructions to determine a signature of the email message and/or instructions to determine a generic portion of the email message. In these examples, non-transitory machine-readable storage medium 110 may also include instructions executable by processing resource 101 such that computing device 100 modifies the email text to indicate a beginning boundary and an ending boundary of the signature. Non-transitory machine-readable storage medium 110 may also include instructions executable by processing resource 101 such that computing device 100 modifies the email text to indicate a beginning boundary and an ending boundary of the generic portion. These modifications may be accomplished as described above for instructions 114 and 115. In some examples, an opening tag for the signature may be <signature>. In some examples, a closing tag for the signature may be </signature>. In some examples, an opening tag for the generic portion may be . In some examples, a closing tag for the generic portion may be .

As discussed above, in some examples, instructions 113 may also include instructions to determine at least one paragraph of the body. In these examples, instructions 115 may also include instructions to modify the email text to indicate a beginning boundary and an ending boundary of each of the paragraphs that are determined. These modifications may be accomplished as described above for instructions 114 and 115. In some examples, an opening tag for a paragraph may be <paragraph>. In some examples, a closing tag for the signature may be </paragraph>.

Instructions 116 may be executable by processing resource 101 such that computing device 100 generates a hash of the header. In some examples, instructions 116 may take the text that is marked by XML header element to generate the hash. As used herein a "hash" includes a numeric value that characterizes a specific set of text. Accordingly a hash value that represents a header may characterize the header. In some examples, a hash value for a specific portion of text is unique to the specific portion of text such that the hash value may be used to identify the specific portion of text. A hash value may be generated by a cryptographic hash function. Some non-limiting cryptographic hash functions include those of the Secure Hash Algorithm (SHA) family (e.g., SHA-1, SHA-256, SHA-512, SHA-3, etc.), MD5, etc. While various cryptographic hash functions may be used, in some examples, the cryptographic hash function may be a function with high collision resistance to ensure a unique value for a specific text portion. As described above, a header of an email message may include different components, such as a "to", a "from", a "subject", etc. In some examples, an individual hash value may be generated for each component. In other examples, one hash value may be generated for all or some of the components (for example, one hash value may represent the "to" and the "from" components and another hash value may represent the "from" component).

In some examples, instructions 116 may include instructions to modify the content of the header before a generation of the hash of the header. This modification of the content may be a normalization of the content in the email text that includes the header. For example, dates that are included in a header may be converted to a constant format. In some examples, words may be stemmed (e.g., where tenses like "ing", "ed", "es", "s", etc. are removed) and tokenized (e.g., where a value is assigned to a certain word and that value is used to represent the word). In some examples, words in a header are not stemmed and tokenized.

In some examples, instructions 116 may also include instructions to modify the email text to include the hash value that is generated. For example, the hash value may be included as a node in the XML element (e.g., as an attribute, a sub-element, etc.).

Instructions 117 may be executable by processing resource 101 such that computing device 100 generates a hash of the body (that is determined by instructions 115). In some examples, instructions 117 may take the text that is marked by XML body element to generate the hash. Similarly as described above in relation to instructions 116, a hash value of the body may also be generated by a cryptographic hash function.

As described above, in some examples, a body of an email message may include at least one paragraph and instructions 113 may include instructions to determine at least one paragraph of the body and instructions 115 may modify the text to indicate a beginning and an ending of at least one paragraph of the body. In these examples, instructions 117 may also include instructions to generate a hash of at least one paragraph of the body. Thus, this may be accomplished by taking the text that is marked by one paragraph element to generate the hash. Similarly as described above in relation to instructions 116, a hash value of a paragraph may also be generated by a cryptographic hash function. A hash value may be generated for each paragraph that is determined. In some examples where a hash value is generated for the paragraphs in the body, a separate hash value that represents the entire body (e.g. one single hash value for all the paragraphs) is not generated. This is because individual hash values for individual paragraphs may be more accurate to trace than a single hash value for an entire body.

Instructions 118 may be executable by processing resource 101 such that computing device 100 traces the email based on the hash of the header of the email message. For example, instructions 118 may compare the hash of the header as generated by instructions 116 to hash values of email messages in other emails, and more specifically of the hash value of the headers of other email messages in other emails. A match of a hash header hash value in two email messages in separate emails may indicate that those separate emails are related to each other.

For example, there may be two emails. Email 1 may be the original email and thus have one email message in it. The email message in email 1 may have a subject header hash value of X. Email 2 may be a reply of email 1. Email 2 may have two email messages: the reply email message and the original email message. Because the original email message in email 2 (email message 2 of email 2) is the same as the original email message in email 1 (email message 1 of email 1), the original email message in email 2 will also have a subject header hash value of X. Based, at least partially, on this similar hash value, computing device 100 may determine that email 2 is traceable to email 1. In some examples, instructions 118 may also trace an email based on the hash value of the body, and the hash value of the paragraphs in the body of the email message. This is described in more detail in relation to FIG. 7A and FIG. 7B.

As discussed above, an email received by instructions 111 may include at least one email message, including two email messages, three email messages, etc. Accordingly, in some examples, non-transitory machine-readable storage medium 110 may also include instructions to determine an email message in the email, and instructions to modify the text of the email to indicate a beginning boundary and an ending boundary of the email message. In some examples, these instructions may determine each email message in the email, and modify the text of the email to indicate each beginning boundary and each ending boundary of each email message. In some examples, each email message is determined through processing the email text and using regular expression processing. Similarly, instructions 112-117 may be executable by processing resource 101 for each email message that is determined. In other words, a header and a body may be determined for each email message in the email and the email text may be modified to indicate a beginning boundary and an ending boundary of each header and each body of each email message. A hash of each header and a hash of each body of each email message may also be generated. In the same vein, instructions 118 may trace an email based on the hash values of all of the headers present in the email. For example, an email with two email messages will have two subject headers. Thus, two hash values may be generated, one hash value representing each subject header. Instructions 118 may trace the email based, at least partially, on the two hash values.

Figure 2:
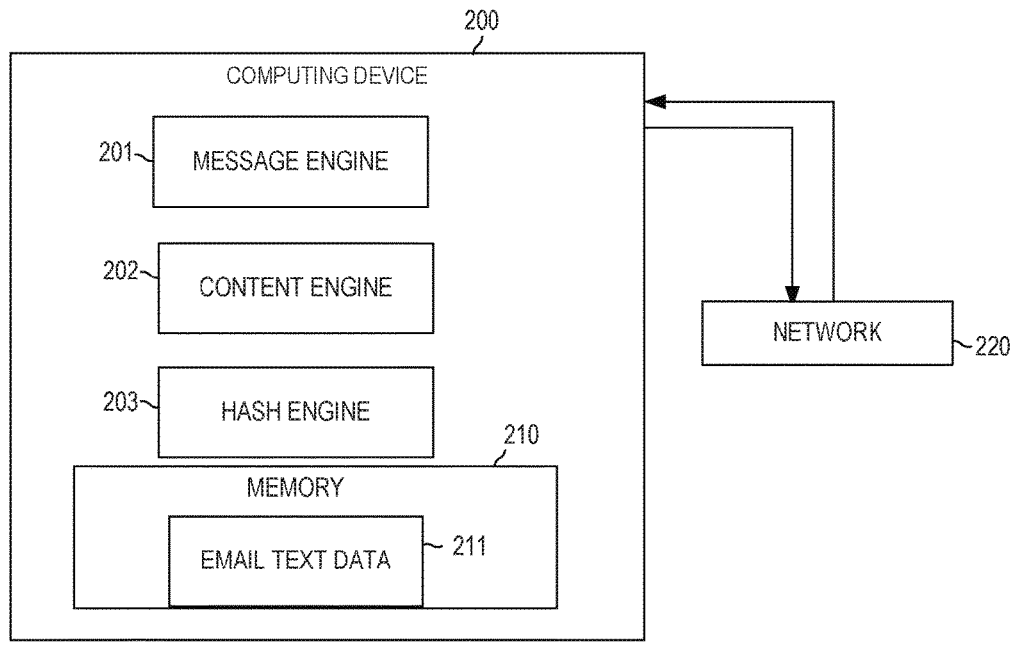
FIG. 2 is a block diagram of a computing device to generate a hash of a header of an email, according to some examples.
Figure 4:
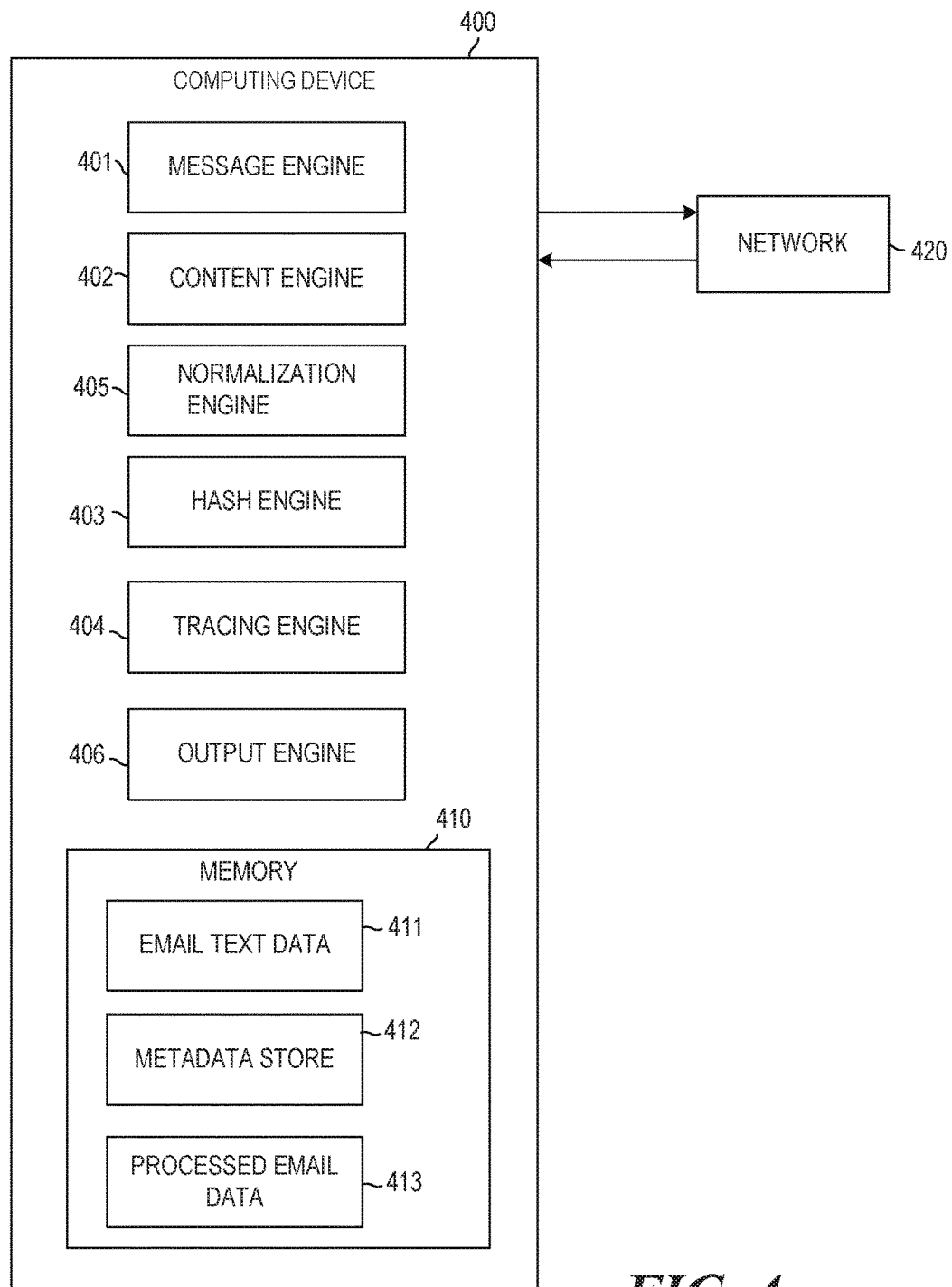
FIG. 4 is a block diagram of a computing device to trace an email based on hash values, according to some examples.

Computing device 100 of FIG. 1, which is described in terms of processors and machine-readable storage mediums, may include one or more structural or functional aspects of computing device 200 of FIG. 2 or computing device 400 of FIG. 4, which are described in terms of engines containing hardware and software.

FIG. 2 is a block diagram of computing device 200 to generate a hash of a header of an email message. Computing device 200, like computing device 100, may be a server, computer networking device, chip set, desktop computer, workstation, or any other processing device or equipment. In some examples, computing device 200 may be a server that interfaces with network 220. Computing device 200 includes message engine 201, content engine 202, and hash engine 203. Each of these aspects of computing device 200 will be described below. Other engines may be added to computing device 200 for additional or alternative functionality. Engines 201, 202, and 203, may interface with memory 210. Memory 210 may be a machine-readable storage medium of computing device 200.

Each of engines 201, 202, 203, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, computing device 200 may include additional engines.

Each engine of computing device 200 can include at least one machine-readable storage medium (for example, more than one) and at least one processing resource (for example, more than one). For example, software that provides the functionality of engines on computing device 200 can be stored on a memory of a computer to be executed by a processing resource of the computer. In some examples, each engines of computing device 200 may include hardware in the form of a microprocessor on a single integrated circuit, related firmware, or other software for allowing a microprocessor to operatively communicate with other hardware of computing device 200.

Message engine 201 is an engine of computing device 200 that includes a combination of hardware and software that allows computing device 200 to receive text of an email, the email comprising an email message. "Email" and "email message", as described above in relation to computing device 100, are applicable here. Additionally, message engine 201 may receive the text as extracted from a binary data file, as discussed above in relation to instructions 111. The email text may be stored in email text data 211 in memory 210. While memory 210 is shown in the example of FIG. 2 as being housed in computing device 200, in other examples, memory 210 may be separate from computing device 200 but accessible to the engines of computing device 200. Memory 210 may include any computer-readable storage medium including, but not limited to, volatile memory (e.g., RAM), and non-volatile memory (e.g., flash memory, EPROM, memristor, etc.).

Message engine 201 also allows computing device 200 to determine a beginning and an end of the email message in the email text. As discussed above in relation to computing device 100, message engine 201 may accomplish this through processing the text of the email using regular expression processing to identify patterns that are representative of an email message. Message engine 201 may also allow computing device 200 to mark the email message with a first extensible markup language (XML) element. As discussed above in relation to computing device 100, marking the email message may include modifying the text of the email to indicate the location of the email message, including a beginning of the email message and an end of the email message and storing the modified version in email text data 211 in memory 210. The XML element may include an opening tag and a closing tag, as discussed above. In some examples, the opening tag may be <email> and the closing tag may be </email>. While many element tagging elements are described herein using XML elements tagging, other forms of tagging or marking the email text may be used by engine 201, engine 202, and other engines described herein.

Content engine 202 is an engine of computing device 200 that includes a combination of hardware and software that allows computing device 200 to determine a beginning and an end of a header of the email message that is determined by message engine 201. Content engine 202 may determine a beginning and an end of a header of the email message by processing the email text (that is saved in memory 210) using format processing. As discussed above in relation to instructions 111, a header (such as a "to" or a "bcc") is expected to have a specific format. Thus, content engine 202 may determine a beginning and an end of a header by finding portions of the email text having the specific format.

Content engine 202 may also allow computing device 200 to determine a beginning and an end of a body of the email message determined by message engine 201. As discussed above in relation to instructions 113, content engine 202 may determine a beginning an end of a body of the email message by processing the email text (saved in memory 210) and determine that the un-marked text is the body of the email message.

Content engine 202 may also allow computing device 200 to mark the header with a second extensible markup language element and mark the body with a third extensible markup language element. Accordingly, the email text saved in email text data 211 may be modified with tags to mark both the header and the body. The extensible markup language element for the header may be characterized as a "second" extensible markup language element to indicate that it is an extensible markup language element that is in addition to the earlier-referenced "first" extensible markup language element for the email message. The "first" and "second" characterizations may or may not correlate to the order in which the elements appear in the email text. Accordingly, the extensible markup language element for the body is characterized is a "third" extensible markup language element to indicate that it is an additional extensible markup language element than the "first" and the "second" extensible markup language elements.

As discussed above in relation to instructions 113 and 115, in some examples, content engine 202 may also allow computing device 200 to determine a beginning and an end of a signature and a beginning and an end of a generic portion of the email message. Content engine 202 may determine the signature via parsing through the email text using regular expression processing and/or machine learning processing, as described above in relation to computing device 100. Content engine 202 may determine the generic portion of the email message using regular expression processing. Similarly, content engine 202 may also allow computing device 200 to mark the signature with an additional extensible markup language element and to mark the generic portion with yet another additional extensible markup language element. The modified text is saved in email text data 211 in memory 210. The email tracing may be more accurate in examples where a signature and/or a generic portion are also determined and marked compared to examples where a signature and/or generic portion are not also determined and marked.

As discussed above in relation to instructions 113 and 115, in some examples, content engine 202 may further divide the body into separate paragraphs. Accordingly, content engine 202 may allow computing device 200 to determine at least one paragraph in the body of the email message and mark a beginning and an end of the at least one paragraph with an extensible markup language element. In some examples where an email message has two or three paragraphs, content engine 202 may determine all of the paragraphs in the email message and mark all the beginnings and endings of the all paragraphs in the email message. Content engine 202 may determine the paragraphs via parsing through the text marked as the body and using java text processing to identify the beginning and the end of each paragraph.

Hash engine 203 is an engine of computing device 200 that includes a combination of hardware and software that allows computing device 200 to generate a hash value representing the header that is determined and marked by the content engine. The discussion above in relation to instructions 116 is also applicable here. The hash engine 203 may also allow computing device 200 to modify the email text to include the hash value. In some examples, the hash value may be included as an attribute that is included in single quotes inside the opening tag of the header. For example, if the opening tag of the header is <subject>, and the hash value of the subject is Y, the opening tag may be <subject id='Y'>. The modified email text with the hash value is saved in email text data 211 in memory 210. In some examples, hash engine 203 may also modify the email text with other details about the hash value, including but not limited to the cryptographic hash function that was used to generate the hash value, etc.

In some examples, hash engine 203 may also allow computing device 200 to generate a hash value representing the body that is determined and marked by the content engine 402. Additionally, in examples where the content engine 402 determines and marks the paragraphs in the body of the email message, hash engine 203 may allow computing device 200 to generate a hash value representing each individual paragraph. Thus, in a body with two paragraphs, hash engine 203 may generate one hash value representing one paragraph and another hash value representing the other paragraph.

As discussed above, the email text received by message engine 201 may include at least one email message, including two email messages up to an X number of email messages. In some examples, message engine 201 may determine each email message in the email and may mark each email message in the email. Accordingly, content engine 202 may determine a header for each email message, and a body for each email message in the email. Content engine 202 may also mark a header for each email message and a body for each message in the email. Similarly, hash engine 203 may generate a hash value for a header in each email message and a hash value for a body in each email message.

Computing device 200 of FIG. 2, which is described in terms of functional engines containing hardware and software, may include one or more structural or functional aspects of computing device 100 of FIG. 1, which is described in terms of processors and machine-readable storage mediums. Computing device 200 of FIG. 2, may include one or more structural or functional aspects of computing device 400 of FIG. 4.

Figure 3:
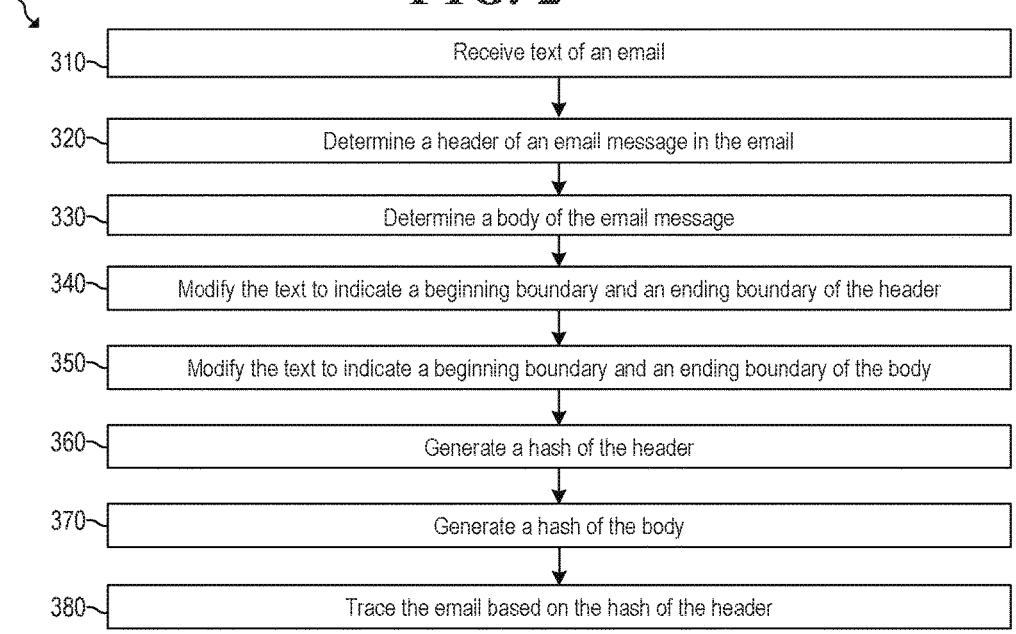
FIG. 3 is a flowchart of a method of tracing an email, according to some examples.

FIG. 3 illustrates a flowchart for an example method 300 to trace an email. Although execution of method 300 is described below with reference to computing device 100 of FIG. 1, other suitable systems for execution of method 300 may be utilized (e.g., computing device 300 or computing device 400). Additionally, implementation of method 300 is not limited to such examples and method 300 may be used for any suitable device or system described herein or otherwise.

At 310 of method 300, processing resource 101 may execute instructions 111 to receive text of an email from network 120. In some examples, an email may include at least one email message, including one email message, two email messages, etc. At 320 of method 300, processing resource 101 may execute instructions 112 to determine a header of an email message in the email. The header may include at least one of "to", "from", "subject", "bcc", "cc", etc. In some examples, the header may include all of these components. In examples where the header includes all of these components, each component is determined separately. For example, a "to" is determined separately from a "from."

At 330 of method 300, processing resource 101 may execute instructions 113 to determine a body of the email message. As discussed above, a body of the email message may be determined by marking any un-marked text as being part of the body. At 340 of method 300, processing resource 101 may execute instructions 114 to modify the text of the email to indicate a beginning boundary and an ending boundary of the header determined at 320. In some examples, the modification of the text may include the addition of an XML element which includes an opening tag and a closing tag for each element. In other examples, other forms of tagging or marking the email text may be used.

At 350 of method 300, processing resource 101 may execute instructions 115 to modify the text of the email to indicate a beginning boundary of an ending boundary of the body determined at 330. At 360 of method 300, processing resource 101 may execute instructions 116 to generate a hash of the header that is marked at 340. At 370 of method 300, processing resource 101 may execute instructions 117 to generate a hash of the body that is marked at 350. At 380 of method 300, processing resource 101 may execute instructions 118 to trace the email based, at least partially on, the hash of the header.

Although the flowchart of FIG. 3 shows certain functionalities as occurring in one step, the functionalities of one step may be completed in at least one step (e.g., in multiple steps). Although the flowchart of FIG. 3 shows a specific order of performance of certain functionalities, method 300 is not limited to that order. For example, 350 may be performed before 340.

FIG. 4 is a block diagram of a computing device 400 interfacing with multiple computing devices in network 420. Computing device 400 includes message engine 401, content engine 402, normalization engine 405, hash engine 403, tracing engine 404, and output engine 406. Engines 401, 402, 403, 404, 405, and 406 may interface with memory 410. Memory 410 may be a machine-readable storage medium of computing device 400. Message engine 401 has similar functionalities to message engine 201 as described above in relation to computing device 200 except that message engine 401 may also receive metadata associated with an email in addition to the email text. Message engine 401 may store the metadata associated with email in metadata store 412 in memory 410. Content engine 402 has similar functionalities to content engine 202 as described above in relation to computing device 200.

Normalization engine 405 is an engine of computing device 400 that includes a combination of hardware and software that allows computing device 400 to modify the content marked by the XML before a hash is generated of the content by hash engine 403.

For example, content engine 402 may determine and mark three headers of an email message with XML elements, including a "to", a "date", and a "subject." Before hash engine 403 generates three hash values, one representing each of the headers, normalization engine 405 may modify the content marked by the elements. In some examples, normalization engine 405 may remove punctuation marks from the tagged content. For example, the "subject" element may include an exclamation point. Normalization engine 405 may modify the content of the "subject" element to remove the exclamation point. As another example, the "date" element may include a date. A date may be written in many different formats. Normalization engine 405 may convert the date to a standard format such that dates are in a consistent format. Normalization engine 405 does not modify the email text with the modified content. Rather, it provides the modified content to hash engine 403. Thus, hash engine 403 receives the modified content instead of what is in the email text.

Content engine 402 may also determine and mark a body of the email message with an XML element. Before hash engine 403 generates a hash value for the body, normalization engine 405 may modify the content marked by the body element. Dates included in the body may be converted to a standard format. Additionally, words may be stemmed and/or tokenized for the ability to link words with the same meanings but different tenses together. Thus, "working", "worked", and "works" may be stemmed to "work". Normalization engine 405 does not modify the email text with the modified content. Rather, it provides this modified content to hash engine 403. Thus, hash engine 403 receives the modified content instead of what is in the email text.

Hash engine 403 is similar to hash engine 203 as described above in relation to computing device 200, except that instead of generate a hash value for the text marked by the elements, hash engine 403 may generate a hash value for the modified content provided by normalization engine 405.

Tracing engine 404 is an engine of computing device 400 that includes a combination of hardware and software that allows computing device to trace the email based, at least partially, on the hash values generated by hash engine 403. In this regard, tracing engine 404 may interface with processed email data 413. Processed email data 413 may be a database of other emails and the hash values associated with the other emails. The data may be stored in a manner that relates the hash value to the element. For example, a hash value for a header may be stored such that it is clear that it is a hash value for a header of a certain email message in an email.

In some examples, tracing engine 404 may trace the email based, at least partially, on the hash value of a header of an email message in the email. For example, tracing engine 404 may compare the hash value of a header of the email message of the hash value of a header of an email message of another email that is stored in processed email data 413. A match between the hash values may indicate that the emails are related to each other. In some examples, tracing engine 404 may trace the email based, at least partially, on the hash value of a header and on the hash value of the paragraphs of an email message in the email. In some examples, engine 404 may trace one email to another email when a threshold number of hash values match between the two emails. For example, tracing engine 404 may compare the hash value of a header of the email message of the hash value of a header of an email message of another email that is stored in processed email data 413. In addition, tracing engine 404 may compare the hash values of the paragraphs of the email message to the hash values of the paragraphs of an email message in the other email that is stored in processed email data 413. A match between the header hash values alone may not be enough to indicate a relationship between the current email and the other email, but an additional match between the paragraph hash values may more strongly indicate a relationship between the current email and the other email. This is described in more detail in relation to FIG. 7A and FIG. 7B.

Output engine 406 is an engine of computing device 400 that includes a combination of hardware and software that allows computing device 400 to output the modified email text to network 420. Accordingly, in some examples, computing device 400 may provide the modified email text with the elements and any added nodes to network 420 to be used by other computing devices in network 420. The modified email text may be characterized as the received email text enriched with XML elements. In addition to the modified email text, output engine 406 may also provide the metadata associated with the email, each hash with the element name of each email message in the email, and extracted content of certain headers (e.g., accounts used in <to>, <from>, <cc>, <bcc>, dates, subject, etc.) of each email message in the email. Additional information that may be provided is a unique identifier for the email message. In some examples, the unique identifier for the email message may be the value of the hash of a header itself. Another piece of information that may be provided is the unique identifier for the "parent" email message of the email message. For example, if the email message is a reply message to an original email message, the parent email message of the reply message is the original email message. In some examples, the unique identifier for the "parent" email message may be a hash of a header of the "parent" email message. This information may be outputted by output engine 406 to a database that is stored elsewhere in network 420. Additionally, this information may also be stored in computing device 400's processed email data 413 so that it is available for quick search and lookup by computing device 400 when access is needed (e.g., by tracing engine 404).

Computing device 400 of FIG. 4, which are described in terms of functional engines containing hardware and software, may include one or more structural or functional aspects of computing device 100 of FIG. 1, which is described in terms of processors and machine-readable storage mediums. Computing device 400 of FIG. 4, may include one or more structural or functional aspects of computing device 200 of FIG. 2.

Figure 5:
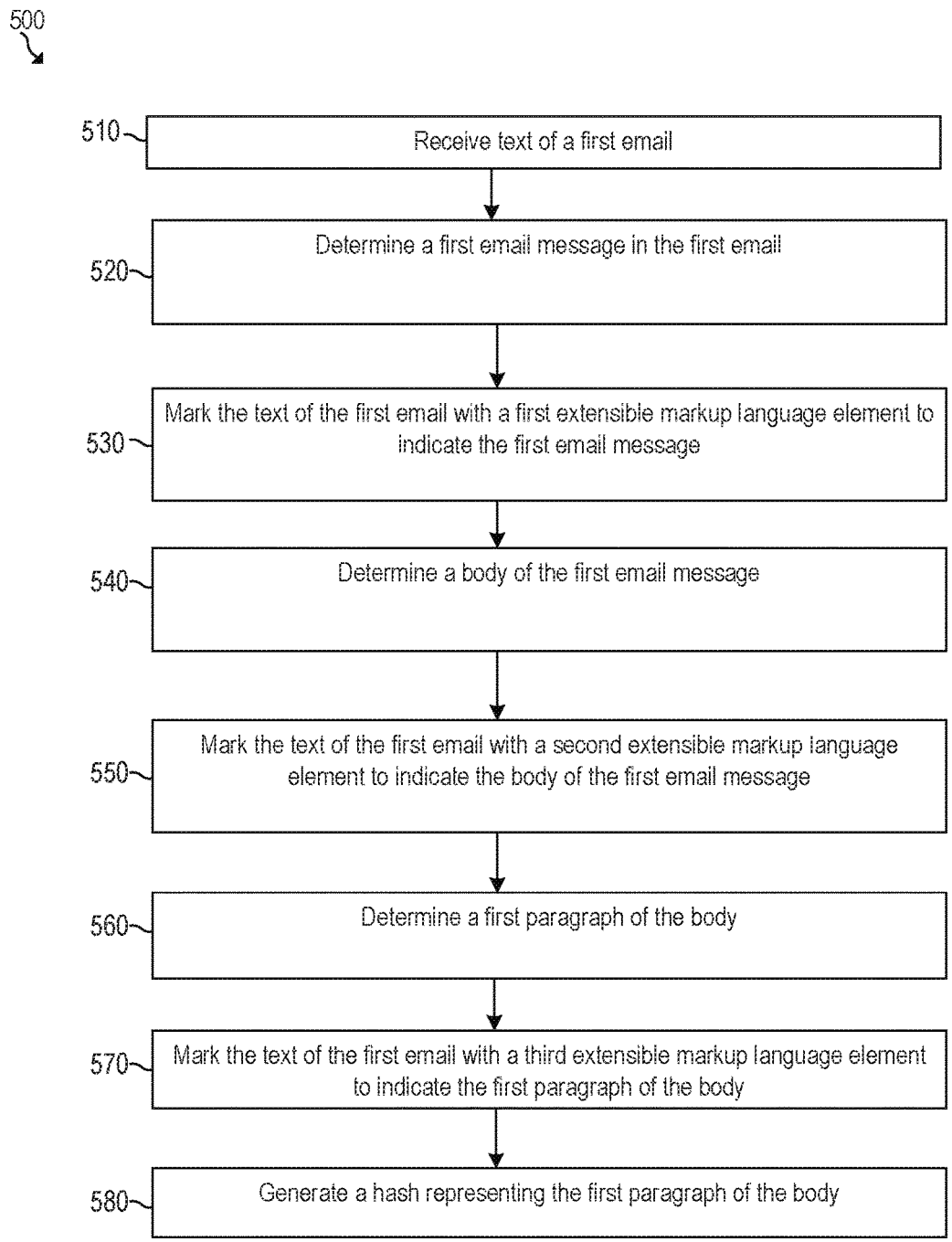
FIG. 5 is a flowchart of a method of generating a hash value representing a paragraph of an email, according to some examples.

FIG. 5 illustrates a flowchart for an example method 500 to generate a hash of a paragraph of a body of an email message. Although execution of method 500 is described below with reference to computing device 400, other suitable systems for execution of method 500 may be utilized (e.g., computing device 100 or computing device 200). Additionally, implementation of method 500 is not limited to such examples, and method 500 may be used for any suitable device or system described herein or otherwise.

At 510 of method 500, message engine 401 may receive text of a first email. The text of the first email may be stored in email text data 411 of memory 410. As discussed above, in some examples, a first email may have at least one email message in the email text. At 520 of method 500, message engine 401 may determine a first email message in the first email. This may be done by interfacing with the email text data 411 and processing the text stored there. At 530 of method 500, message engine 401 may mark the text of the first email with a first extensible markup language element to indicate the first email message. In some examples, this includes modifying the text of the first email to include an opening tag before the beginning of the text of the first email message and a closing tag after the ending of the text of the first email message. The modified text version is saved in email text data 411 of memory 410. At 540 of method 500, content engine 402 may determine a body of the first email message. At 550 of method 500, content engine 402 may mark the text of the first email with a second extensible markup language element to indicate the body of the first email message. At 560 of method 500, content engine 402 may determine a first paragraph of the body marked at 550. In some examples, this may be done via processing the text captured by the second extensible markup language element using lava text processing.

At 570 of method 500, content engine 402 may mark the text of the first email with a third extensible markup language element to indicate the first paragraph of the body. At 580 of method 500, hash engine 403 may generate a hash representing the first paragraph of the body. Although the flowchart of FIG. 5 shows a first email, a first email message in the first email, and a first paragraph in the first email message, method 500 is not limited to the number of emails, email messages, or paragraphs shown. For example, method 500 may be used on a second email. Additionally, method 500 may be used to determine a second email message in the first email or to determine a second paragraph of the body in the first email message. In some examples, functionalities described herein in relation to FIG. 5 may be provided in combination with functionalities described herein in relation to any of FIGS. 1-4. Although the flowchart of FIG. 5 shows certain functionalities as occurring in one step, the functionalities of one step may be completed in at least one step (e.g., in multiple steps). Additionally, while the flowchart of FIG. 5 shows a specific order of performance of certain functionalities, method 500 is not limited to that order. For example, 540 may be performed before 530.

Figure 6A:
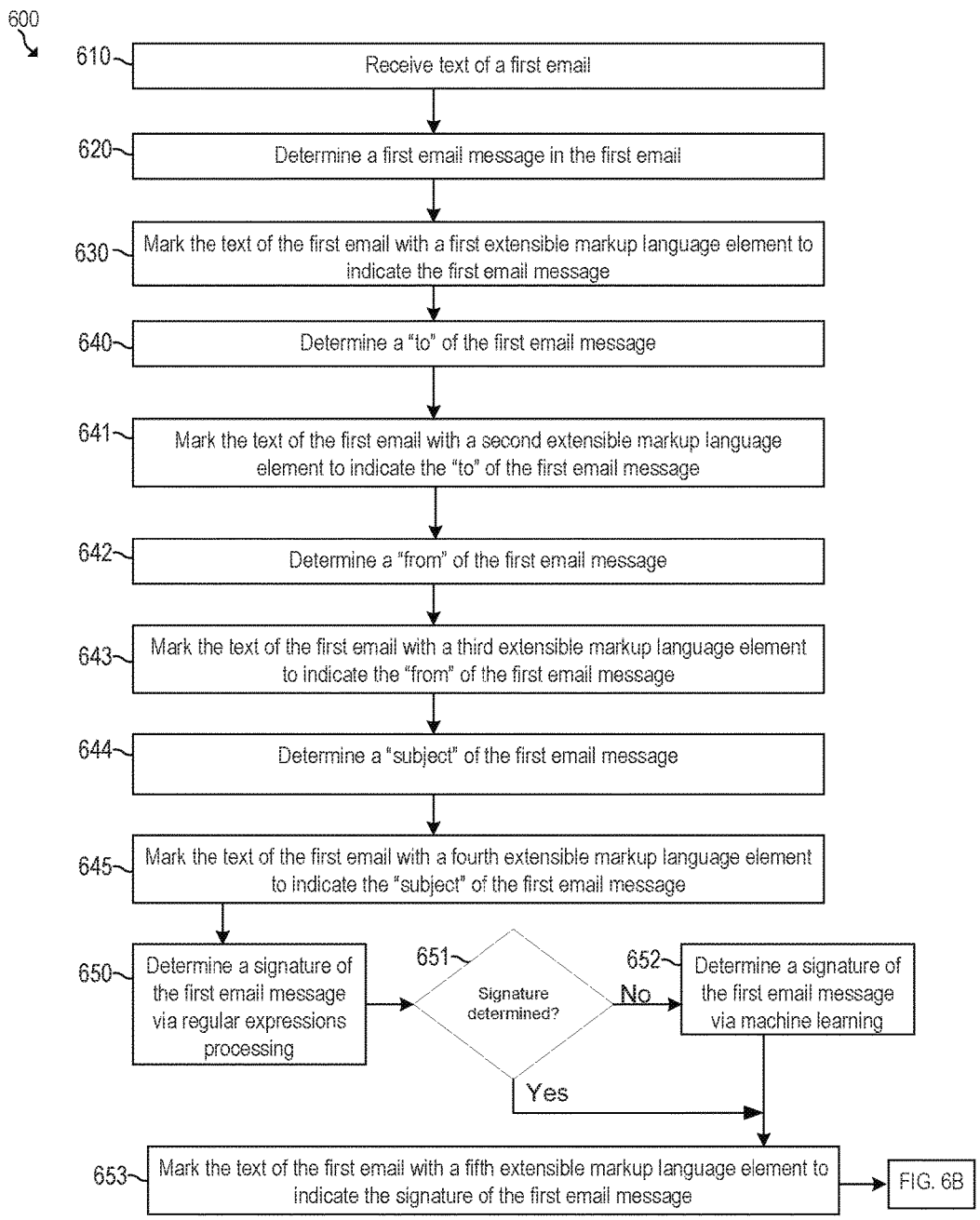
FIG. 6A is a flowchart of a method of tracing an email based on hash values representing a header and a paragraph of an email, according to some examples.
Figure 6B:
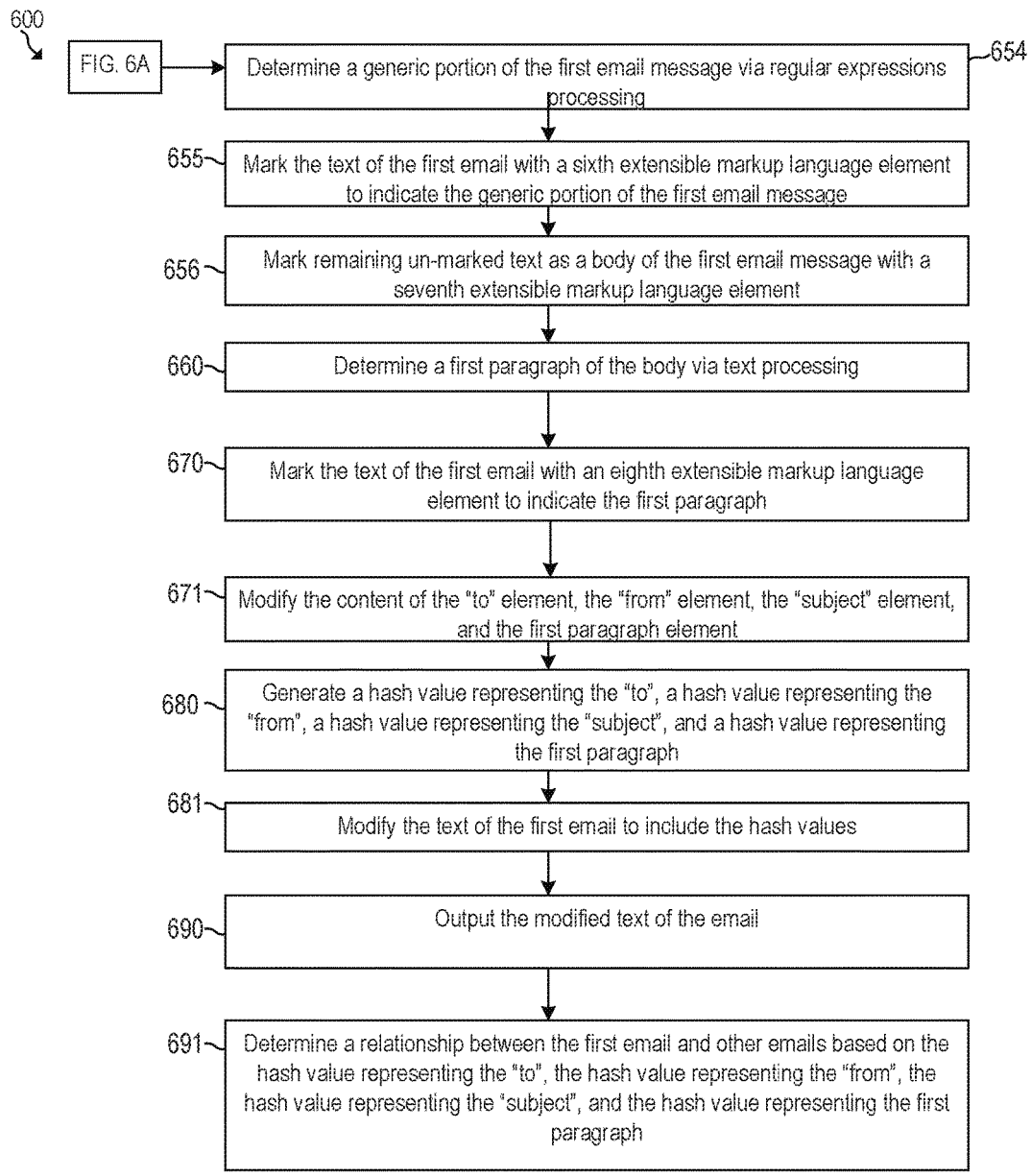
FIG. 6B is a continuation of the flowchart illustrated in FIG. 6A.

FIGS. 6A and 6B illustrate a flowchart for an example method 600 to trace an email based on a hash value representing a header of an email message in the email and hash value representing a paragraph of a body of the email message. Although execution of method 600 is described below with reference to computing device 400 of FIG. 4, other suitable systems for execution of method 600 may be utilized (e.g., computing device 100 or computing device 200). Additionally, implementation of method 600 is not limited to such examples, and method 600 may be used for any suitable device or system described herein or otherwise.

610 is similar to 510, 620 is similar to 520, and 630 is similar to 520. Thus, the discussion of 510, 520, and 530 are applicable to 610, 620, and 630, respectively.

At 640 of method 600, content engine 402 may determine a "to" of the email message that is marked in 630. As discussed above, the "to" may be characterized as a header of the email message. At 641 of method 600, content engine 402 may mark the text of the first email with a second extensible markup language element to indicate the "to" of the email message. The modified email text may be saved in email text data 411 of memory 410. At 642 of method 600, content engine 402 may determine a "from" of the first email message. As discussed above, the "from" may also be characterized as a header of the email message. At 643 of method 600, content engine 402 may mark the text of the first email with a third extensible markup language element to indicate the "from" of the first email message. The modified email text may be saved in email text data 411 of memory 410. At 644 of method 600, content engine 402 may determine a "subject" of the first email message. As discussed above, the "subject" may also be characterized as a header of the email message. At 645, content engine 402 may mark the text of the first email with a fourth extensible markup language element to indicate the "subject" of the first email message.

At 650, content engine 402 may determine a signature of the first email message. As discussed above, in some examples, this may be determined via regular expression processing. At 651, content engine 402 may determine if a signature is determined via the regular expression processing in 650. Responsive to a determination that there is a signature determined, method proceeds to 653. Responsive to a determination that a signature is unable to be determined via regular expression processing, method 600 proceeds to 652. At 652, content engine 402 may determine a signature of the first email message via machine learning as a secondary method or an alternative to regular expression processing at 650. Method 600 then proceeds to 653. The modified email text may be saved in email text data 411 of memory 410.

At 653 of method 600, content engine 402 marks the text of the first email with a fifth extensible markup language element to indicate the signature of the first email message. At 654 of method 600, content engine 402 determines a generic portion of the first email message. In some examples, and as discussed above, content engine 402 may do this by processing the text of the email using regular expression processing. At 655 of method 600, content engine 402 marks the text of the first email with a sixth extensible markup language element to indicate the generic portion of the first email message. The modified email text may be saved in email text data 411 of memory 410.

At 656 of method 600, content engine 402 marks any remaining un-marked text in the email text as a body of the first email message. Because the headers, the signature, and the generic portion have been marked, the remaining un-marked text represents the primary portion, or the body of the email message. The body may be marked with a seventh extensible markup language element. The modified email text may be saved in email text data 411 of memory 410.

At 660 of method 600, content engine 402 may determine a first paragraph of the body. In some examples, content engine 402 may do this via text processing of the text that was marked as the body. At 670, content 402 marks the text of the first email (and specifically of the body) with an eighth extensible markup language element to indicate the first paragraph. The modified email text may be saved in email text data 411 of memory 410. At 671, normalization engine 405 may modify the content of the "to" element, the "from" element, the "subject" element, and the first paragraph element. The discussion above in relation to normalization engine 405 is applicable here.

At 680 of method 600, hash engine 403 generates separate hash values representing the different marked elements. Thus, hash engine 403 may generate a hash value representing the "to" element, a hash value representing the "from" element, a hash value representing the "subject" element, and a hash value representing the first paragraph. The hash values are generated from the modified contents as modified at 671 by normalization engine 405 instead of the original content included in the elements. At 681, hash engine modifies the text of the first email to include the hash values. As described above, the hash values may be included as a node in the XML element (e.g., as an attribute, a sub-element, etc.).

At 690, output engine 406 outputs the modified text of the email to network 420. The outputted information may be used by other computing devices in network 420 or stored in databases in network 420. At 691, tracing engine 404 may determine a relationship between the first email and other emails based, at least partially, on the hash value representing the "to" element, the hash value representing the "from" element, the hash value representing the "subject" element, and the hash value representing the first paragraph. Tracing engine 404 may interface with processed email data 413 which may include hash values associated with email messages in other emails. A match between these hash values may indicate a relationship between the first email and the email with which the matched hash values are associated with.

FIG. 7A illustrates a diagram of three emails and the relationships between the emails. FIG. 7B illustrates example hashes of the three emails. Email 700 may be the original email that is sent from sender A to recipients B, C. Because email 700 is an original email, it may include one email message. The subject of email 700 is "Tomorrow." The one email message of email 700 may have two paragraphs. Paragraph 1 of message 1 of email 700 includes the text "Hi All—Excited about tomorrow?" Paragraph 2 of message 1 email 700 includes the text "Please meet at my cube at 1:00 pm."

Email 701 may be a partial forward of some of the content of original email 700. As seen in FIG. 7B, email 701 may have one email message. It may be sent from sender A. The subject of email 701 is "Tomorrow." Email 701 may have one email message. The one email message may have two paragraphs. Paragraph 1 of message 1 of email 701 includes the text "Details as follows for tomorrow's event:" Paragraph 2 of message 1 of email 701 includes the text "Please meet at my cube at 1:00 pm." In this example, email 701 may be sent by user A, the same user that sent out email 700, after user A has realized that additional users should know about the information in email 700. Instead of forwarding email 700, user A decides to copy and paste paragraph 2 of email 700 into email 701.

Email 702 may be a full forward of original email 701. Email 702 may include two email messages. The first email message has a subject of "FW: Tomorrow" from user C. The first email message of email 702 has one paragraph with the following text: "Check out A's message below." The second email message of email 702 has a subject of "Tomorrow" and is sent by user A. The second email message of email 702 is similar to the one email message of email 700. The first paragraph includes the text "Hi All—Excited about tomorrow?" The second paragraph includes the text: "Please meet at my cube at 1:00 pm."

In the example of FIG. 7B, a hash value is generated for the "subject", the "from", and the paragraphs of the email messages in each emails. In other examples, a hash value may be generated for other header components, such as the "to", "bcc", etc.

Email 700 has a hash value of X (703), Y (704), W (705), and Z (706). Email 701 has a hash value of U, X (703), Y (704), and Z (706). Email 702 has a hash value of X (703), Y (704), W (705), Z (706), and V. Thus, email 701 has three hash values (703, 704, and 706) that are similar to email 700 and email 702 has four hash values (703, 704, 705, and 706) that are similar to email 700.

When tracing email 701, instructions 118 or tracing engine 404, as discussed above, may determine that email 701 is a partial forward of email 700 because email 701 has an email message that has some but not all of the hash values of email 700. When tracing email 702, instructions 118 or tracing engine 404, as discussed above, may determine that email 702 is a full forward of email 700 because one of the email messages in email 702 has exactly the same hashes as email 700. Accordingly, instructions 118 and/or tracing engine 404 may determine that two email messages are related when a threshold number of hash values match between the two email messages. Additionally, when tracing email 701, instructions 118 or tracing engine 404, as discussed above, may take into consideration the position of the dissimilar hashes. For example, email 701 is missing hash value 705. The paragraph represented by hash value 705 comes before the paragraph represented by hash value 706 in the original email. Because email 701 is missing this "middle" hash value, it is less likely that email 701 is a full forward of original email 700.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions to trace and group a plurality of emails based on context, executable by a processing resource to:
   receive text of an email;
   determine a header of an email message in the email;
   determine a body of the email message;
   modify text relating to the header to generate modified header text, wherein to modify the text relating to the header the instructions are further executable to:
      indicate a beginning boundary and an ending boundary of the header, prior to a generation of a hash value representing the header, including marking the text of the email with a first tag to indicate where the header is located;
      convert a text element in the header to a standard format; and
      tokenize a word from the header to generate a first word link;
   modify text relating to the body to generate modified body text, wherein to modify the text relating to the body the instructions are further executable to:
      indicate a beginning boundary and an ending boundary of the body, including marking the text of the email with a second tag to indicate where the body is located;
      convert a text element in the body to a standard format; and
      tokenize a word from the body to generate a second word link;
   generate the hash value representing the header using the modified header text and the first tag indicating where the header is located;
   generate a hash value of the body using the modified body text and the second tag indicating where the body is located;
   modify the text of the email to include the hash value representing the header as an attribute inside the first tag;
   modify the text of the email to include the hash value of the body as an attribute inside the second tag; and
   trace the modified email based on the hash value of the header.

2. The non-transitory machine-readable storage medium of claim 1, comprising instructions executable by the processing resource to:
   trace the modified email based further on the hash value of the body.

3. The non-transitory machine-readable storage medium of claim 1, comprising instructions executable by the processing resource to:
   determine a signature of the email message; and
   modify the text of the email to indicate a beginning boundary and an ending boundary of the signature.

4. The non-transitory machine-readable storage medium of claim 1, comprising instructions executable by the processing resource to:
   determine a generic portion of the email message; and
   modify the text of the email to indicate a beginning boundary and an ending boundary of the generic portion.

5. The non-transitory machine-readable storage medium of claim 1, wherein the modification of the text relating to the header to indicate the beginning boundary and the ending boundary of the header and the modification of the text relating to the body to indicate the beginning boundary and the ending boundary of the body comprises using extensible markup language.

6. The non-transitory machine-readable storage medium of claim 1,
   wherein the body of the email message comprises a first paragraph and a second paragraph;
   wherein the instructions to determine the body of the email message comprises instructions to determine the first paragraph and the second paragraph;
   wherein the instructions to modify text relating to the body to indicate a beginning boundary and an ending boundary of the body comprise:
      instructions to modify the text relating to the body to indicate a beginning boundary and an ending boundary of the first paragraph; and
      instructions to modify the text relating to the body to indicate a beginning boundary and an ending boundary of the second paragraph; and
   wherein the instructions to generate the hash value of the body comprises:
      instructions to generate a hash value of the first paragraph; and
      instructions to generate a hash value of the second paragraph.

7. The non-transitory machine-readable storage medium of claim 6, comprising instructions executable by the processing resource to:
   trace the modified email based further on the hash value of the first paragraph and the hash value of the second paragraph.

8. A computing device to trace and group a plurality of emails based on context, comprising:
   a processor; and
   a computer-readable medium comprising machine-readable instructions executable by the processor to:
      receive text of an email, the email comprising an email message;
      determine a beginning and an end of the email message;
      mark the email message with a first extensible markup language element;
      determine a beginning and an end of a header of the email message;
      modify text relating to the header to generate modified header text, wherein to modify the text relating to the header the machine-readable instructions are further executable to convert a text element in the header to a standard format and to tokenize a word from the header to generate a first word link;

determine a beginning and an end of a body of the email message;
modify text relating to the body to generate modified body text, wherein to modify the text relating to the body the machine-readable instructions are further executable to convert a text element in the body to the standard format and to tokenize a word from the body to generate a second word link;
mark the header with a second extensible markup language element prior to a generation of a hash value representing the header;
mark the body with a third extensible markup language element;
generate a hash value representing the header using the modified header text and the second extensible markup language element that marks the header;
generate a hash value representing the body using the modified body text and the third extensible markup language element that marks the body;
modify the text of the email to include the hash value representing the header as an attribute inside the second extensible markup language element;
modify the text of the email to include the hash value representing the body as an attribute inside the third extensible markup language element; and
trace the modified email based on the hash value of the header.

9. The computing device of claim 8, wherein the machine-readable instructions cause the processor to:
determine the beginning and the end of the email message through regular expression processing.

10. The computing device of claim 8, wherein the machine-readable instructions cause the processor to:
determine a beginning and an end of a signature of the email message; and
mark the signature with a fourth extensible markup language element.

11. The computing device of claim 10, wherein the machine-readable instructions cause the processor to:
determine a beginning and an end of a generic portion of the email message; and
mark the generic portion with a fifth extensible markup language element.

12. The computing device of claim 8,
wherein the body comprises a first paragraph and a second paragraph; and
wherein the machine-readable instructions cause the processor to:
determine a beginning and an end of the first paragraph;
determine a beginning and an end of the second paragraph;
mark the first paragraph with a fourth extensible markup language element;
mark the second paragraph with a fifth extensible markup language element; and
generate a hash value representing the first paragraph using the fourth extensible markup language element that marks the first paragraph; and
generate a hash value representing the second paragraph using the fifth extensible markup language element that marks the second paragraph.

13. The computing device of claim 12, wherein the machine-readable instructions cause the processor to:
trace the modified email based further on the hash value representing the header, the hash value representing the first paragraph, and the hash value representing the second paragraph.

14. A method for tracing and grouping a plurality of emails based on context, comprising:
receiving text of a first email;
determining a first email message in the first email;
marking the text of the first email with a first extensible markup language element to indicate the first email message;
determining a body of the first email message;
modifying text relating to the body of the first email message to generate modified body text, the modifying text relating to the body of the first email message including:
marking the text of the first email with a second extensible markup language element to indicate the body of the first email message;
converting a text element in the body of the first email message to a standard format; and
tokenizing a word from the body of the first email message to generate a first word link;
determining a first paragraph of the body of the first email message;
marking the text of the first email with a third extensible markup language element to indicate the first paragraph of the body of the first email message;
determining a header of the first email message;
modifying text relating to the header to generate modified header text, the modifying the text relating the header including:
marking the text of the first email, prior to a generation of a hash value representing the header, with a fourth extensible markup language element to indicate the header;
converting a text element in the header to the standard format; and
tokenizing a word from the header to generate a first word link;
generating a hash value representing the first paragraph of the body of the first email message using the modified body text and the third extensible markup language element indicating the first paragraph of the body of the first email message;
generating the hash value representing the header using the modified header text and the fourth extensible markup language element indicating the header;
modifying the text of the first email to include the hash value representing the first paragraph of the body of the first email message as an attribute inside the third extensible markup language element;
modifying the text of the first email to include the hash value representing the header as an attribute inside the fourth extensible markup language element; and
tracing the modified first email based on the hash value of the header.

15. The method of claim 14, comprising
receiving text of a second email;
determining a second email message in the second email;
marking the text of the second email with a fifth extensible markup language element to indicate the second email message;
determining a body of the second email message, the body of the second email message comprising a second paragraph;
marking the text of the second email with a sixth extensible markup language element to indicate the body of the second email message;
determining the second paragraph from the body of the second email message;

generating a hash value representing the second paragraph from the body of the second email message using the sixth extensible markup language element indicating the body of the second email message; and determining a relationship between the second email and the first email based on the hash value representing the first paragraph of the body of the first email and the hash value representing the second paragraph from the body of the second email message.

16. The method of claim 14, comprising:

tracing the modified first email further based on the hash value representing the first paragraph of the body of the modified first email.

* * * * *